United States Patent [19]

Neely, Jr.

[11] 3,942,651

[45] Mar. 9, 1976

[54] BALED HAY STACK FORMING APPARATUS

[76] Inventor: Allen B. Neely, Jr., 12991 E. Nevada, Aurora, Colo. 80012

[22] Filed: July 27, 1972

[21] Appl. No.: 275,479

[52] U.S. Cl. .................... 214/6 B; 214/6 P; 214/7
[51] Int. Cl. ............................................ B65g 57/28
[58] Field of Search ............... 214/6 B, 6 P, 7, 6 DK

[56] References Cited
UNITED STATES PATENTS 3,523,616    8/1970    Neely, Jr. ........................... 214/6 B Primary Examiner—Robert J. Spar
Attorney, Agent, or Firm—Van Valkenburgh, Lowe & Law

[57] ABSTRACT

An apparatus to form a hay bale stack which lies upon its side and upon the bed of a truck, trailer or similar vehicle. The bed will be tipped upwardly to discharge the bale stack in an upright position.

A bale collecting, conveying and dispensing apparatus is mounted at the side of the vehicle. A shiftable stack-layer-forming platen is carried upon a framework above the bed of the vehicle and above a stack being formed on the bed. Hay bales picked up by the dispensing apparatus are shifted onto this platen to form a stack layer. When a stack layer is completed, the platen tips, dropping the layer on its edge at the forward end of the vehicle bed. A pusher means pushes the bale stack layers rearwardly as they are deposited upon the bed.

When a bale stack is completed, the bale collecting and dispensing apparatus may be disconnected from the vehicle, and the vehicle is then driven to a location where the stack is to be discharged. Once the bed is tipped upwardly to stand the bale stack upright, the tines of a holding fork, at the base of the stack and at the rear end of the vehicle bed, reciprocate to facilitate movement of the fork from underneath the upright stack as the vehicle moves away from the stack.

12 Claims, 19 Drawing Figures

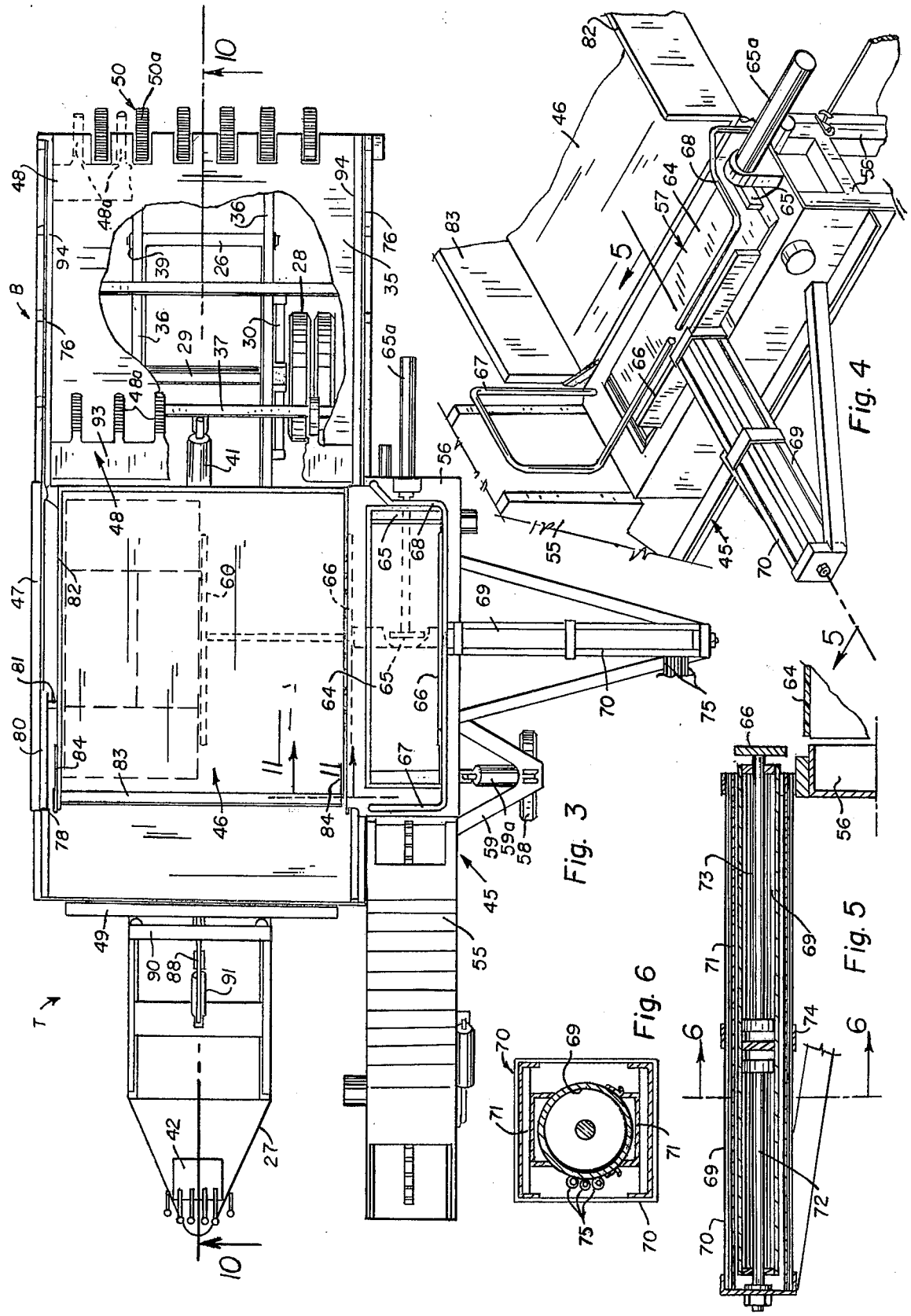

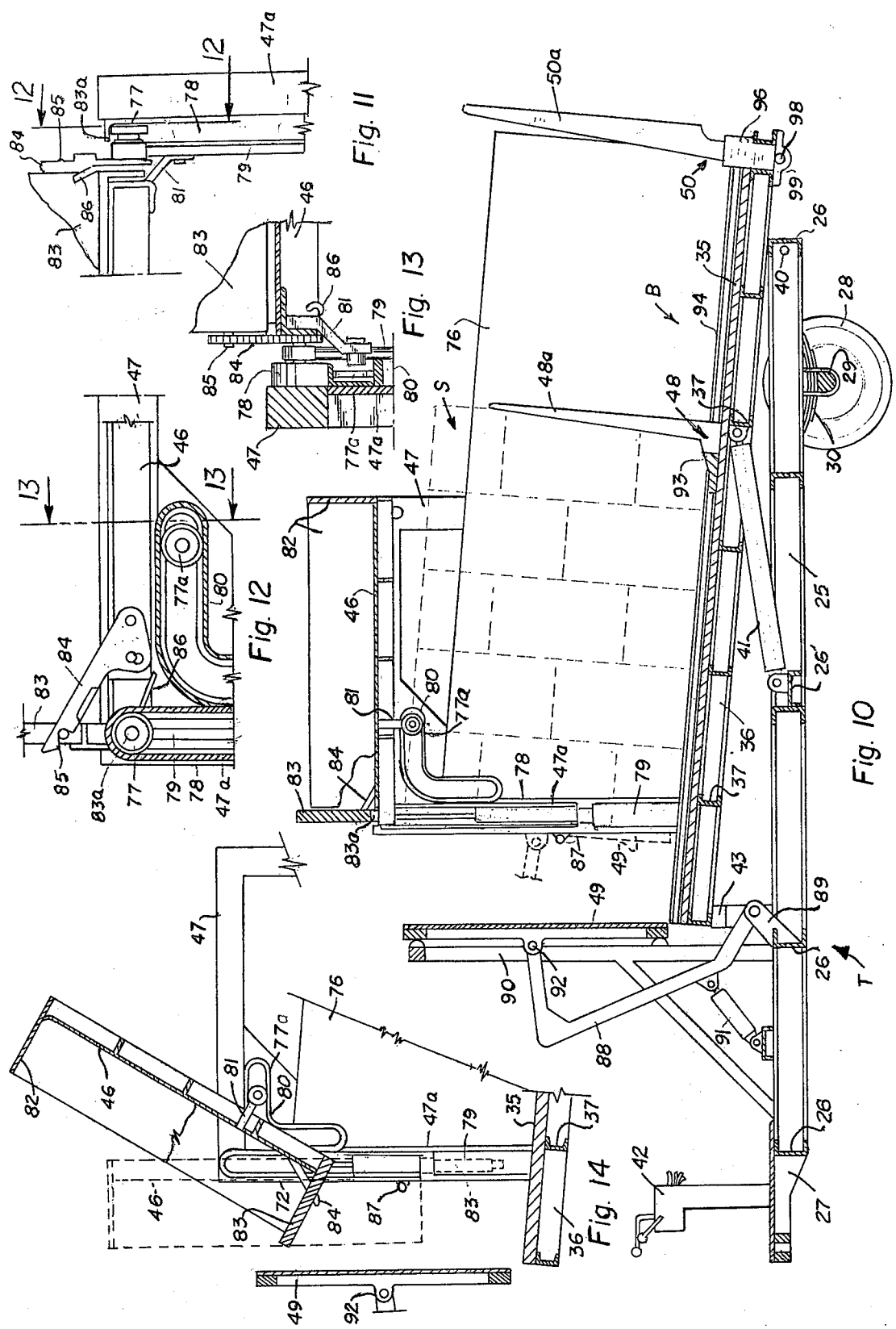

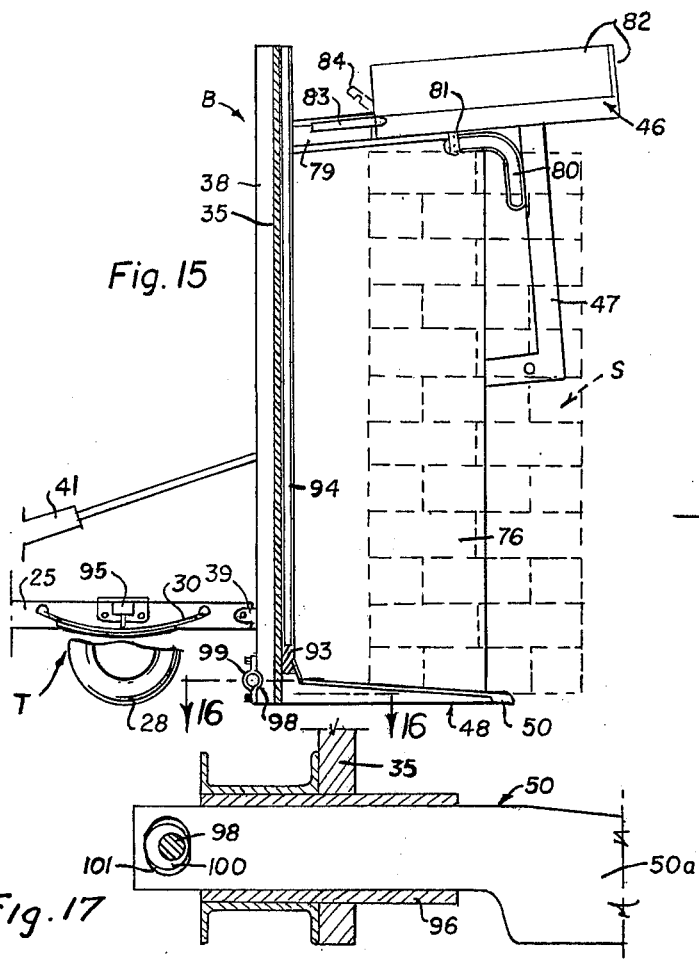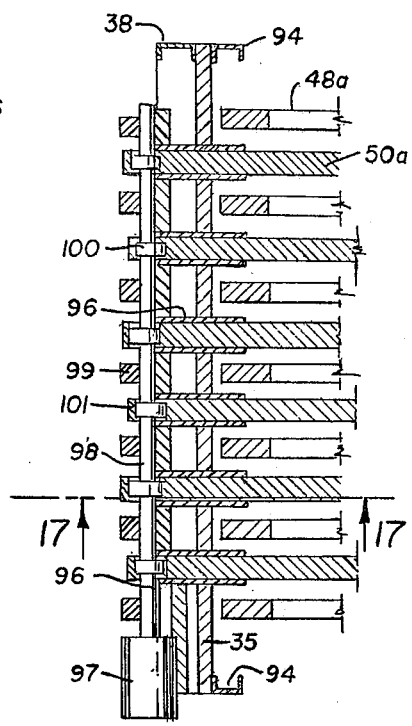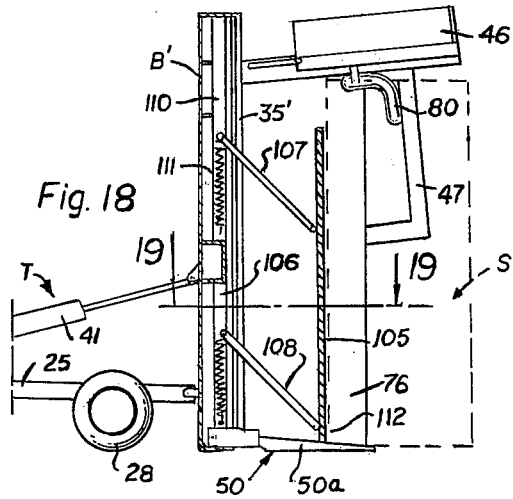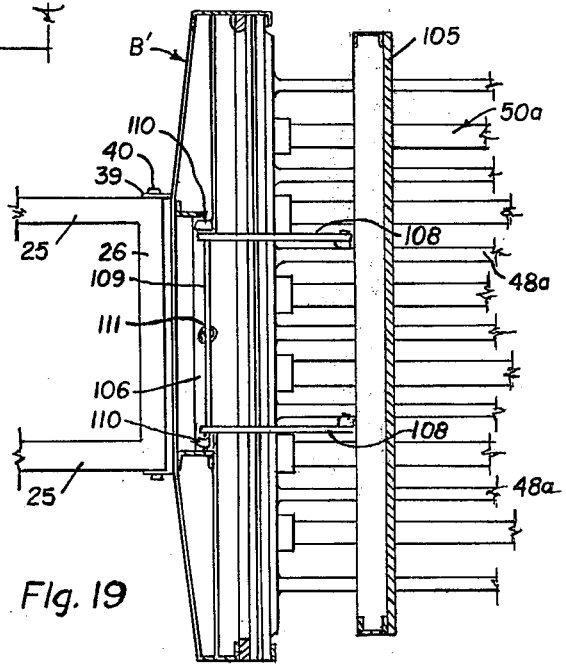

BALED HAY STACK FORMING APPARATUS

This invention relates to hay bale collecting and stacking apparatus and more particularly to mobile bale stacking apparatus which will pick up, stack and convey hay bale stacks to any desired location.

A primary object of the present invention is to provide a novel and improved mobile apparatus, carried upon a vehicle, a truck or trailer, to pick up hay bales from a field, form the bales into stack layers and then place the layers in a stack which lays upon its side on the bed of the truck, or trailer, and which will tip upwardly to discharge the stack in a proper, upright position.

The present invention is an improvement over my invention of a bale stacking machine set forth in my U. S. Pat. No. 3,523,616. That patent discloses an apparatus wherein hay bales are picked up by a collecting and lifting conveyor alongside a vehicle. This conveyor lifts the bales to a dispensing chamber. Thence, the bales are shifted to a horizontally disposed assembly platform over the bed of the vehicle where a group of bales are formed as an interlocking stack layer. Whenever a layer is completed, the platform shifts laterally and out of the way to drop the layer upon a stack being formed on the bed of the vehicle. Naturally, the height of each bale stack so formed is limited to the height of the assembly platform above the truck bed, and usually this height will not exceed six to eight feet. Thus, a limitation is imposed upon the apparatus in that the height of the bale stacks formed by it is often insufficient for effective storage. Often a haystack is needed which is twelve to sixteen feet high, and in some types of hay bale stacking apparatus this is accomplished by forming a bale stack which lays on its side in a tippable bed of a vehicle.

The present invention was conceived and developed with the above considerations in view and comprises, in essence, a bale stack forming apparatus having a bale collecting and lifting conveyor alongside the vehicle, a bale dispensing chamber at the top of this conveyor, and a stack layer assembly platform over the bed of the vehicle alongside the chamber. The stack layer assembly platform in the present invention is adapted to permit a bale layer formed thereon to be tipped so that the bale layer will stand on edge when placed on the bed of the vehicle.

Accordingly, this arrangement of depositing a sequence of bale layers on edge will permit a bale stack to be formed in the bed of the vehicle which lays on its side, with the height of the stack being restricted only by the length of the vehicle. For example, the effective bed length of a vehicle may be sixteen feet, more or less, and the resulting stack, when tipped to an upright position, can be almost as high as the sixteen foot bed length. The present invention also includes, in combination with the components above set forth, other mechanisms to affect and control the tipping of the stack layers, the shifting of stack layers in the bed of the truck, the upward tipping of the truck bed to stand the stack and a means to move the upright stack from the apparatus.

It follows that another object of the invention is to provide a novel and improved apparatus for forming a hay bale stack having a height which is restricted only by the length of the bed of the apparatus.

Another object of the invention is to provide a novel and improved apparatus for forming a hay bale stack which can be mounted either upon a truck or a trailer, and in either case will result in a vehicle whose overall length is not excessive and an arrangement which does not require an additional eight to ten foot length for stack layer-forming-platform at one end of the vehicle.

Another object of the invention is to provide a novel and improved hay bale stacking apparatus which is carried upon a vehicle and which includes an apparatus capable of automatically and sequentially picking up, lifting and dispensing hay bales from a field and into the vehicle, and which is removably mounted upon the apparatus as an auxiliary component, to be easily disconnected from the vehicle to permit the vehicle to travel over public roads as a conventional truck or trailer.

Another object of the invention is to provide, in a hay bale stacking apparatus of the type which picks up bales from the field, arranges the same into stack layers, forms a stack laying upon its side upon the bed of a vehicle, and thereafter tips the stack to an upright position, a novel and improved apparatus for discharging the bale stack from the vehicle once it is tipped to its upright position.

Other objects of the invention are to provide a novel and improved hay bale stacking apparatus which is simple, sturdy, easy to operate, versatile in the manner in which it may be used, and is economical, rugged and durable.

With the foregoing and other objects in view, all of which fore fully hereinafter appear, my invention comprises certain constructions, combinations and arrangements of parts and elements as hereinafter described, defined in the appended claims and illustrated in preferred embodiment in the accompanying drawing in which:

FIG. 3 is a plan view similar to FIG. 1, but with some components being broken away to show parts otherwise hidden from view, with a bale-stack-holding component on the bed of the truck being shifted from its retracted position shown at FIG. 1 and with the movement of certain other components being shown in broken lines.

FIG. 4 is an isometric view of the chamber forming the bale dispensing component of the apparatus, as taken from the indicated arrow 4 at FIG. 1, but on an enlarged scale.

FIG. 5 is a sectional view as taken from the indicated line 5—5 at FIG. 4, but on an enlarged scale.

FIG. 6 is a transverse sectional view as taken from the indicated line 6—6 at FIG. 5, but on a further enlarged scale.

FIG. 10 is a longitudinal sectional view as taken from the indicated line 10—10 at FIG. 3, with dash lines indicating a bale stack being formed in the bed of the trailer and dotted lines indicating an alternate position of a pusher element for shifting the bale stack on the vehicle bed.

FIG. 11 is a fragmentary sectional detail as taken from the indicated line 11—11 at FIG. 3, but on an enlarged scale.

FIG. 12 is a fragmentary sectional detail as taken from the indicated line 12—12 at FIG. 11.

FIG. 13 is a fragmentary sectional detail as taken from the indicated line 13—13 at FIG. 12.

FIG. 14 is a fragmentary portion of the showing at FIG. 10, but with the layer-forming platform being tipped as to discharge a bale layer onto the bed of the trailer.

FIG. 15 is a longitudinal sectional view of the bale stacking apparatus as taken from the indicated line 15—15 at FIG. 1, showing only the rear portion of the trailer and with the bed of the vehicle being tipped to discharge a stack of bales, shown in broken lines, and with a portion of the trailer wheel being broken away to show components otherwise hidden from view.

FIG. 16 is a fragmentary sectional detail as taken from the indicated line 16—16 at FIG. 15, but on an enlarged scale.

FIG. 17 is a fragmentary sectional detail as taken from the indicated line 17—17 at FIG. 16, but on a further enlarged scale.

FIG. 18 is a somewhat diagrammatic longitudinal sectional view similar to FIG. 15, but on a reduced scale and illustrates a shiftable restraining plate to hold a bale stack together while it is being unloaded from the apparatus.

FIG. 19 is a sectional detail as taken from the indicated line 19—19 at FIG. 18, but on an enlarged scale.

Figure 1:
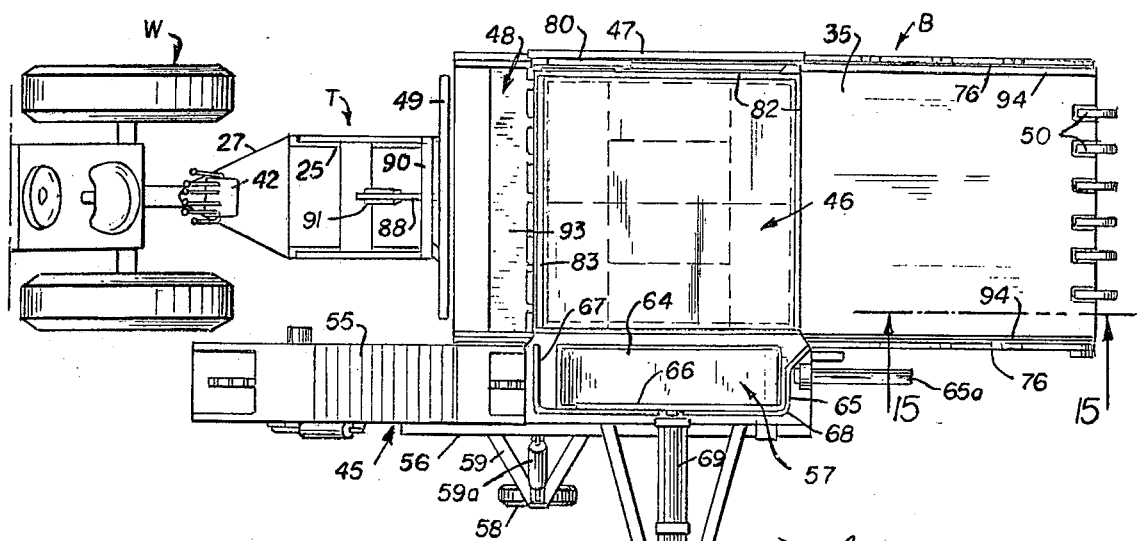
FIG. 1 is a plan view of one embodiment of my improved hay bale stacking apparatus, which is mounted upon a trailer and hitched to a tractor, the figure showing only the rear portion of the tractor, and also showing an auxiliary bale collecting and dispensing apparatus attached to the right hand side of the apparatus, with respect to its direction of movement.

The hay bale stack forming apparatus may be mounted upon any suitable vehicle such as a truck or trailer, and in the drawing the apparatus is shown as being mounted upon a trailer. However, this is entirely optional.

Figure 2:
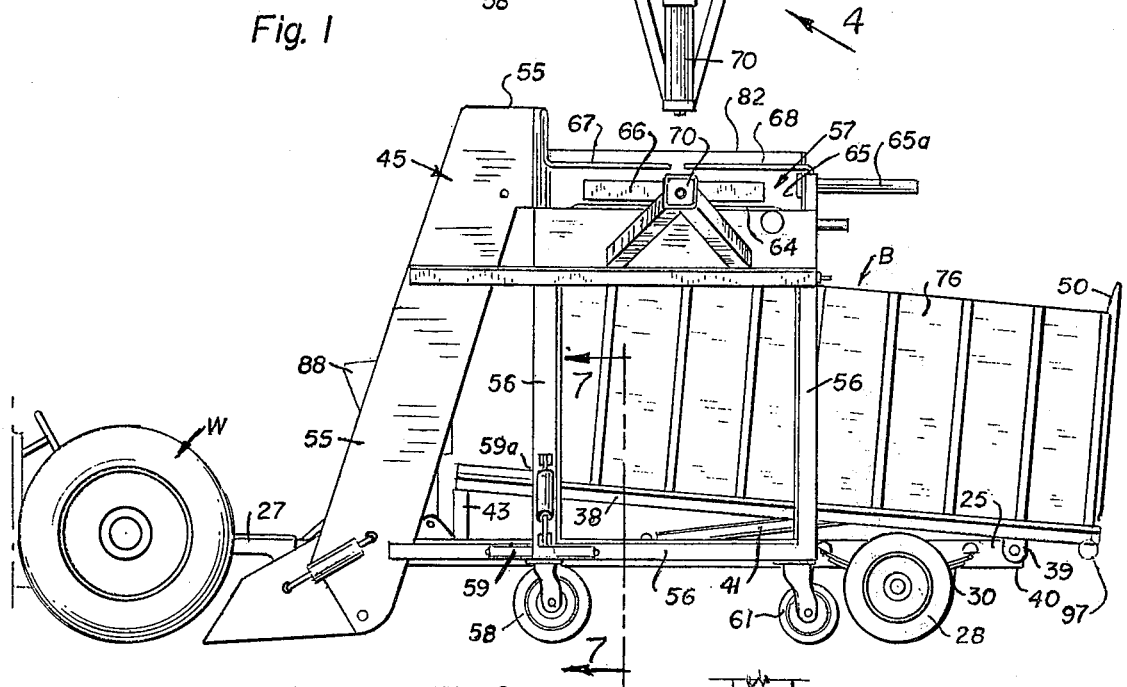
FIG. 2 is a right hand side elevational view of the bale stacking apparatus shown at FIG. 1.

Referring more particularly to the drawing, the trailer T is built in a conventional manner. Its framework includes longitudinal beams 25 held apart in spaced parallelism by cross members 26. A tongue 27 is provided at the front end of this trailer for connection with a tractor W, the rear portion of which is shown at FIGS. 1 and 2. This trailer frame is mounted upon wheels 28 near the rear end of the beams 25, and the wheels are connected to a common axle 29 which is suspended from the beams 25 by springs 30.

A rectangular stack bed B is adapted to carry a bale stack S, as shown in broken lines at FIGS. 10 and 15. The bed includes a flat deck 35 which is mounted upon a framework having central longitudinal beams 36, which are directly above the longitudinal trailer beams 25. The bed framework also includes transverse cross members 37 and longitudinal sidebeams 38. The rear portion of this stack bed B is pivotally connected to the rear end of the trailer beams 25 by ears 39 depending from the central bed beams 36 and connecting with a transverse pivot bar 40 extending through the rear of the beams 25. This permits tipping of the stack bed at the rear end of the trailer to a vertical position for unloading a stack as shown at FIG. 15. To effect such tipping, a hydraulic cylinder 41 is secured to a cross member 26' on the trailer frame, and its piston rod is secured to a cross member 37 on the stack bed frame. This hydraulic cylinder is operated by a hydraulic power source which is at the tractor W. Hydraulic lines, not shown, extend from the tractor to a control panel 42 which is conveniently located on the tongue 27 of the trailer in reach of an operator. Thence hydraulic lines extend to the cylinder 41 and to other hydraulically operated components hereinafter described.

The position of the stack bed B is preferably not level, but is tilted rearwardly somewhat, with respect to the horizontal trailer body to better hold a stack as hereinafter described, and to assure retaining this bed in a tipped position, a crossbeam 43 is mounted upon the trailer beams 25 underneath the front end of the bed to contact the beams 36, as best illustrated at FIG. 10.

The several components which cooperate to form a hay bale stack upon the stack bed B, by picking up hay bales laying in a field, will be mounted as subassemblies alongside the trailer T and upon the Trailer bed B. A bale collecting and dispensing apparatus 45 is attached to one side of the trailer. A stack layer-forming platen 46 is shiftably carried in framework members 47 upstanding from the forward end of the bed B. This platen 46 is normally held horizontally above the bed B to receive bales from the collecting and dispensing apparatus 45, but when a bale stack layer is formed thereon, the platen tips forwardly to drop the bale stack layer on its edge upon the bed B.

Once a stack layer is dropped upon the bed, a transverse, sliding stack-restraining fork 48, upstanding from the bed B, holds the stack layers forming a partially completed stack, in position upon the bed B. A transverse, stack-shifting platen 49 upstands from the forward end of the trailer to move over the bed B to push bale stack layers rearwardly as they are deposited upon the bed. Discharge forks 50 at the rear end of the bed hold the completed stack as the bed is tipped to stand the stack upright and then reciprocate to facilitate removing the stack, as will be explained.

The bale collecting and dispensing apparatus 45 is substantially the same as that described in my U.S. Pat. Nos. 3,523,616 and 3,596,777. A conventional bale collecting and lifting conveyor 55 is mounted at the leading edge of a narrow box-like framework 56, having one side secured to the trailer and the other side supported by a caster wheel, as will be described. A bale dispensing chamber 57, similar to the units described in my patents, is mounted upon the frame 56 to receive bales from the collector-conveyor 55 and move the same laterally onto the platen 46. The several motors and actuators which are required for moving the bales through the conveyor and through the dispensing chamber, as will be described, are preferably hydraulic, and the necessary hydraulic lines, not shown, are directed to the control panel 42, or any other suitable control system, not shown.

The framework 56 for this collecting and dispensing apparatus 45 is supported by the trailer T at the trailer side, as will be described, and by a caster wheel 58 at the opposite side which depends from an outrigger arm 59 pivotally connected to the framework 56 for vertical adjustments, as by a hydraulic cylinder 59a, such being desirable when the apparatus moves over uneven ground. A second caster wheel 61 is mounted under this framework 56 at the rear end thereof for supporting the apparatus 45 when it is disconnected from the trailer.

Figure 7:
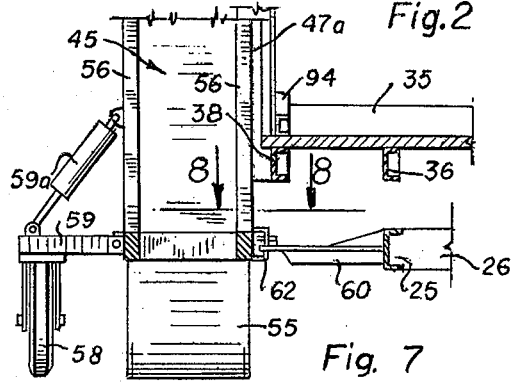
FIG. 7 is a fragmentary sectional view, as taken from the indicated line 7—7 at FIG. 2, but on an enlarged scale, to illustrate the framework of the auxiliary component and the manner of attachment of this component to the trailer.
Figure 8:
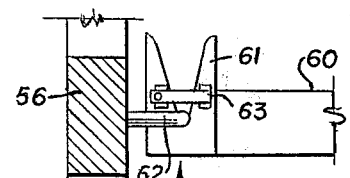
FIG. 8 is a fragmentary sectional detail, as taken from the indicated line 8—8 at FIG. 7.
Figure 9:
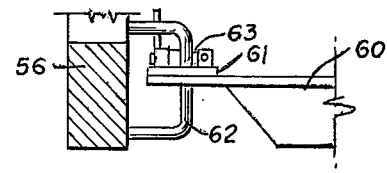
FIG. 9 is a fragmentary elevational view as taken from the indicated arrow 9 at FIG. 8.

The collecting and dispensing apparatus 45 must be disconnected from the trailer should it be necessary to move the trailer over a public road, because the excess width imparted by the apparatus 45 would not make such movement possible. FIGS. 7, 8 and 9 show a hooking means for attaching the apparatus 45 to the frame 25 of the trailer. An arm 60 outstands from the frame member 25 and extend to the edge of the apparatus as shown at FIG. 7. A horizontal, wedge-shaped hook 61 at the end of this arm, oriented in the direction of movement of the trailer, connects with an upright U-shaped post 62 outstanding from the frame 56 to be engaged by the hook 61. A lock 63 holds the post in the throat of the hook 61 when it is positioned as shown at FIG. 8. This arrangement of hooks on two or more arms 60 provides for a quick, effective connection of the apparatus 45 to and from the trailer T.

The bale dispensing chamber 57 includes a longitudinally-disposed floor whereon a moving belt 64 shifts bales rearwardly from the exit of the conveyor 55. The rearward movement of a bale is stopped at a selected position by an end stop plate 65 which is carried upon the piston of a hydraulic cylinder 65a. Once a bale is positioned by this end stop plate 65, as shown in FIG. 3 at the solid line or the dotted line positions of the plate, it will be pushed out of the chamber and onto the platen 46 by a side pusher plate 66, or swung out of the chamber by a forward swing arm 67 or a rearward swing arm 68. These movements, which are described in detail in my prior patents, will produce an interlocked pattern of bales upon the platen 46 to form a bale layer as indicated in dashed lines at FIG. 1.

In contrast with the disclosure of my former patents, it was found expedient to use a side pusher plate 66, which not only pushes a bale from the dispensing chamber 57 and onto the platen 46, but also pushes a group of bales across the platen as indicated in dotted lines at FIG. 3. A double-section extension cylinder 69 is mounted in an outstanding arm 70, as best shows at FIGS. 3, 4 and 5. This arm, mounted upon the side wall of the chamber member, is suitably reinforced and is provided with guideways 71 for movement of the cylinder therein, as best shown at FIG. 6. The double cylinder 69 has a rearwardly directed piston 72 which is affixed to the end of the arm 70 to push the cylinder outwardly from the arm and push the side pusher plate 66 to a first position across the baling chamber 57. A second forwardly directed piston arm 73 extends outwardly beyond the cylinder to extend the side pusher plate 66 over the platen. A block 74 in the cylinder 66 separates these two pistons, and thus the cylinder 66 functions as two, interconnected, operatively-independent cylinder units. The lines 75 to these two cylinder units are indicated at FIG. 6 and are shiftable with the shifting of the cylinder. These lines extend to the control panel 42 in any suitable manner, not shown.

The layer-forming platen 46 is shiftably suspended between two upright frame bents 47. Each frame bent 47 upstands from a side edge of the stack bed B near the front end of the unit, and it is to be noted that these bents merge with suitable sidewalls 76 of the stack bed which function to laterally restrain the bales of a stack being formed upon the bed. The frame bents 47 and the platen 46 are proportioned so that the platen will normally lay horizontally above the stack bed B alongside the dispensing chamber 57 to receive bales therefrom and to support a stack layer of bales.

This platen 46 will then move forwardly and tip to drop the bale layer upon its edge at the forward edge of the stack bed. This movement is controlled by wheels 77 and 77a outstanding from the sides of the platen to move in tracks at the inner face of each bent. The track and wheel arrangement may be varied, and one such arrangement is illustrated at FIGS. 10 to 14. A vertical track 78 is mounted upon each forward post 47a of the bents 47. Each of these tracks guides a wheel 77 at the corresponding forward corner of the platen 46. The vertical movement of the front corner wheels 77 in these tracks pulls the front end of the platen 46 downwardly. This downward movement is effected by a hydraulic cylinder 79 mounted alongside each forward post 47a, and the cylinders 79 are connected by suitable lines to the control panel 42.

A second track 80 at each frame bent 47 extends horizontally underneath the horizontal platen position and thence downwardly alongside the track 78. A wheel 77a, mounted upon an arm 81 at each side of the platen 46 rides in its respective track 80. When at the downward limit of movement, the platen is vertical, as shown in broken lines at FIG. 14.

To hold a bale layer in position, a wall 82 is located at the side of the platen opposite the dispensing chamber 57 and at the rear end of the platen. A trip gate 83 is pivotally mounted upon the front end of the platen so that it may serve as a wall when the platen is at its normal horizontal postion, but will trip when the platen is tipped to a vertical position. This gate 83 may be pivoted upon shafts 83a which also hold the corner wheels 77 in position. The trip mechanism includes a lock arm 84 on each side of the platen which engages a lug 85 on the adjacent side of the gate whenever the gate is upward and serving as a wall. A spring 86 at each side of the platen will urge the gate to its upward position. However, stops 87 on the vertical bent members near the bottom point of the vertical movement of the platen will trip the arms 84 to permit the gate to fall downwardly to an open position. Thus, the gate keeps a bale layer on the platen until it has moved to an on-edge position for dropping upon the stack bed. Once dropped, the cylinders 79 can return the platen to its normal horizontal position at the top of the bent and the springs 86 will swing the gate upwardly.

When a bale layer is dropped upon the sloping stack bed, it must be pushed rearwardly along the bed. This is accomplished by the shifting platen 49. This shifting platen is carried upon a swing arm 88 pivotally mounted to the front end of the trailer frame, as upon a pivot 89 at the center of a cross member 26. A suitable buttress framework 90 upstands from the trailer frame in front of the shifting platen 49 to hold the platen in place when it is retracted forwardly as illustrated at FIG. 10. A hydraulic cylinder 91 is mounted upon the trailer frame and connected with the swing arm 88 for rearward actuation of the pusher platen. The connection of the pusher platen 49 to the swing arm 88 is at a pivot 92 to permit the platen to rock and change its position with respect to the arm as it pushes a bale layer rearwardly as to a position shown in broken lines at FIG. 10. The hydraulic lines connecting with the cylinder extend to the control panel 42 as heretofore described.

As a stack is formed upon the bed B, the first layer of this stack is pushed rearwardly against the restraining fork 48 to become the bottom layer when the stack is tipped to its upright position, as heretofore mentioned. This restraining fork 48 is formed as a transverse array of upright, spaced-apart tines 48a which are held by a flat, transverse base 93 at the bed deck 35. Each end of this base is slidably fitted in a guideway 94 upstanding from the adjacent side edge of the deck 35, as shown at FIGS. 3 and 10, and thus the fork 48 may shift rearwardly along the deck as a stack is formed thereon, as from an initial position shown at FIG. 1 to an intermediate position shown at FIGS. 3 and 10 and to a final position shown at FIG. 15 and partially shown in broken lines at FIG. 3. The tines 48a of the restraining fork 48 will lay between the tines of the discharge fork 50 when the restraining fork 48 is moved to the rear end of the bed. This restraining fork 48 is a conventional expedient used on hay bale stacking apparatus similar to the apparatus herein described, and its rearward movement is responsive to the pushing action of the shifting platen 49. Suitable retraction apparatus, not shown, may be used to return the forks to the forward end of the deck.

The discharge fork 50 comes into play whenever a bale stack is completed upon the trailer bed and is hauled to its destination. The stack bed B is then tipped upwardly as to the position shown at FIG. 15, and the platen 46 is shifted about the frame to a position above and clear of the bale stack, as illustrated. It is necessary that the tines of the discharge fork 50 have sufficient strength to hold the upright stack. Nevertheless, the stack bed B. is so proportioned with respect to the pivot connection on the end of the trailer as to permit the fork 50 to be set upon the ground behind the trailer when the bed is tipped upright. For adjustment purposes, a hydraulic cylinder 95 is mounted upon each beam 25 of the trailer, and its piston engages the axle 29 of the trailer wheels. Thus, the cylinders 95 will hold the beams 25 of the trailer at a proper elevation regardless of the action of the trailer springs 30.

The tines 50a of discharge fork 50 extend across the rear of the bed B at a spacing complimentary to that of the tines of the restraining fork 48 so the two may intermesh as previously mentioned. Each discharge fork tine 50a is slidably mounted in a sleeve 96 in the rear of the stack bed B, and as shown at FIGS. 16 and 17, these tines 50a are adapted to reciprocate. A hydraulic motor 97, controlled by lines extending to the control panel 42, rotates a shaft 98 mounted at the underside of the stack bed B in suitable bearings 99. Cams 100 on the shaft 98 are fitten into transverse pockets 101 at the base of each tine 50a, and the shaft 98 extends through these pockets. The pockets 101 are transversely elongated with respect to the tines 50a to permit rotation of the cams 100 therein with resultant reciprocation of these tines 50a in the sleeves 96. The cams 100 are set to cause reciprocation of the tines 50a in an alternating manner so that some tines are retracting while others are extending. Thus, whenever a bale stack is tipped to its upright position, reciprocation of the tines 50a will permit the trailer to easily move away from the bale stack as illustrated at FIG. 15.

Often the bales forming a bale stack are soft and slippery and it becomes difficult to hold a bale stack together, even when the bales in the several layers are interlocked. Therefore, as a further modification to the apparatus above described, it becomes desirable to have a plate, ordinarily at the deck of the stack bed, to extend from the deck and against the side of the stack as it is being pushed off the fork 50.

In the arrangement shown at FIGS. 18 and 19, this plate 105 forms a portion of the deck 35' of the stack bed B'. The stack bed is modified to provide a pocket 106 underneath the plate 105 wherein the upper ends of a pair of upper arms 107 and a pair of lower amrs 108 are fitted to transverse guide bars 109 to swing outwardly therefrom. These guide bars 109 are held in ways 110 in the pocket and are urged downwardly by springs 111. The lower ends of the arms 107 and 108 are pivotally connected to the push plate 105 in a general parallelogram arrangement, and the lower end of this plate 105 will be held against the tines 50a of the discharge fork 50 when the plate 105 moves outwardly, as best shown at FIG. 18. To minimize frictional resistance a wheel 112 at the bottom of the plate 105 may be used to engage a tine 50a.

Accordingly, a downward pull by the springs 111 will urge the plate 105 outwardly and against a stack being unloaded from the apparatus. When the stack is unloaded, the stack bed B will be returned to its flat position and the weight of the plate 105 will return it to its initial flat position upon the deck.

I have now described my invention in considerable detail. However, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

I claim:

1. A bale collecting and stack forming apparatus adapted to be mounted upon a vehicle and comprising, in combination therewith:

a longitudinally extended stack bed having its rear section pivotally mounted upon the rear end of the vehicle to tip from a flat initial position upon the body of the vehicle to an upright position behind the vehicle, whereby to lift a bale stack lying on its side upon the stack bed to an upright position behind the truck for discharge of the stack therefrom;

a tipping means to tip the bed from a flat position to an upright position when a bale stack, lying on its side, is on the stack bed;

a shiftable platen normally positioned above the stack bed and above a bale stack formed upon the bed to receive bales arranged as a bale stack layer;

a platen shifting means operable after a bale stack layer is received on the platen to shift the platen from the aforesaid normal position above the stack to a substantially vertical position near the front end of the stack bed and to then drop the bale stack layer upon its edge on the forward end of the stack bed and to thereafter return the platen to its aforesaid normal position;

a layer shifting means to shift a bale stack layer dropped onto the stack bed towards the rear of the stack bed whereby the bale stack layer may become part of a bale stack lying upon the stack bed; and, means for dispensing bales onto the platen and arranging the bales in the form of a stack layer.

2. In the apparatus defined in claim 1, including: a slidable restraining fork means upstanding from the stack bed adapted to hold on edge that stack layer which becomes the bottom layer of a hay bale stack formed upon the bed and to move rearwardly upon the stack bed as other layers are dropped upon the forward end of the bed and are shifted rearwardly by the aforesaid shifting means.

3. In the apparatus defined in claim 1, wherein said platen is carried upon frame members upstanding from the side of the stack bed, and said platen is adapted to shift to its aforesaid vertical position when the bed is tipped to its upright, stack-discharging position, whereby to remain clear of a bale stack when it is tipped upright and discharged from the apparatus.

4. In the apparatus defined in claim 1, wherein said means for dispensing bales onto the platen includes:
   a framework mounted alongside the stack bed and extended upwardly to the aforesaid platen above the bed;
   a pick-up and conveyor means at the forward end of the frame adapted to pick up bales lying in a field as the vehicle moves towards and past the bales and to convey the bales upwardly to an elevation above the platen; and,
   a dispensing chamber means alongside the platen adapted to receive bales from the pick-up and conveyor means and to dispense the bales onto the platen in a stack layer arrangement.

5. In the apparatus defined in claim 4 including a means for disconnecting the means for dispensing the bales from the vehicle as when a bale stack is completed.

6. In the apparatus defined in claim 1, including holding forks upstanding from the rear edge of the stack bed to hold a bale stack upon the bed when the bed tips from its flat position to an upright position for the discharge of the bale stack.

7. In the apparatus defined in claim 6, including means to reciprocate the forks to facilitate the removal of the forks from under the stack when the stack is stood upright.

8. In the apparatus defined in claim 7, wherein the reciprocating means includes:
   pockets at the rear end of the bed wherein the forks are shiftably held;
   a shaft extending transversely across the bed adjacent to the forks;
   cams upon the shaft reciprocably engaging the forks; and
   means to rotate the shaft.

9. In the apparatus defined in claim 7 including a push plate at the stack bed adapted to move outwardly from the stack bed and to push against an upright stack when the bed and stack are tipped to an upright position and said apparatus is moving away from the stack to remove the forks from underneath the stack.

10. In the apparatus defined in claim 1, wherein said platen includes a trip gate at its forward edge, a latch means adapted to hold the gate upright and to hold a bale stack layer upon the platen as the platen tips to a vertical position, and release means adapted to release the gate when the gate has tipped to a vertical position whereby to permit the gate to open and drop the bale stack layer upon the stack bed.

11. In the apparatus defined in claim 1, wherein the shifting means includes a shifting platen upstanding across the front of the bed and means adapted to shift the shifting platen rearwardly and over the bed to engage and push rearwardly a bale stack layer dropped thereon.

12. In the apparatus defined in claim 1, wherein the body of said vehicle is a wheel mounted unit, including a pair of wheels on an axle at the rear of the unit, wherein the body of the vehicle is carried upon springs supported by the wheel axle and a jack means between the vehicle body and the axle, adapted to be extended to support the body of the vehicle wherever the stack bed is tipped from a flat position to an upright position.

* * * * *